(12) United States Patent
Otto et al.

(10) Patent No.: US 10,423,603 B2
(45) Date of Patent: Sep. 24, 2019

(54) SYSTEMS AND METHODS FOR IMPLEMENTING A MULTI-HOST RECORD LOCK MECHANISM

(71) Applicants: Michael C Otto, Roseville, MN (US);
Carl R Crandall, Roseville, MN (US);
Forest F Crocker, Roseville, MN (US);
Lnda J Brock, Roseville, MN (US);
Douglas A Fuller, Roseville, MN (US);
Michael J Rieschl, Roseville, MN (US)

(72) Inventors: Michael C Otto, Roseville, MN (US);
Carl R Crandall, Roseville, MN (US);
Forest F Crocker, Roseville, MN (US);
Lnda J Brock, Roseville, MN (US);
Douglas A Fuller, Roseville, MN (US);
Michael J Rieschl, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 468 days.

(21) Appl. No.: 15/187,973

(22) Filed: Jun. 21, 2016

(65) Prior Publication Data

US 2017/0364545 A1    Dec. 21, 2017

(51) Int. Cl.
*G06F 9/52* (2006.01)
*G06F 16/23* (2019.01)

(52) U.S. Cl.
CPC ............ *G06F 16/2343* (2019.01); *G06F 9/52* (2013.01); *G06F 16/2379* (2019.01)

(58) Field of Classification Search
CPC ......... G06F 17/30362; G06F 17/30377; G06F 9/45558; G06F 2009/45583; G06F 2009/45595; G06F 16/2343; G06F 9/52; G06F 16/2379
See application file for complete search history.

(56) References Cited

U.S. PATENT DOCUMENTS

| | | | |
|---|---|---|---|
| 6,247,025 B1* | 6/2001 | Bacon | G06F 17/30362 |
| 7,290,105 B1* | 10/2007 | Jeter, Jr. | G06F 9/526 |
| | | | 711/150 |
| 2005/0289143 A1* | 12/2005 | Oshri | G06F 12/00 |
| 2016/0371318 A1* | 12/2016 | Hillel | G06F 16/2343 |
| 2016/0371322 A1* | 12/2016 | Gunti | G06F 17/30377 |

* cited by examiner

*Primary Examiner* — Albert M Phillips, III

(57) ABSTRACT

A method includes determining, by a processor, whether a program check condition exists. The method further includes determining, by the processor, whether a lock descriptor of a lock in a file lock table satisfies an unlocking condition. The method further includes releasing, by the processor, the lock by setting the lock descriptor's host identifier as zero. The method further includes determining, by the processor, whether any lock in the file lock table satisfies a lock conflict condition. The method further includes determining, by the processor, whether the file lock table includes any lock descriptor that satisfies a locking condition. The method further includes creating, by the processor, a new lock using the lock descriptor that satisfies the locking condition.

17 Claims, 10 Drawing Sheets

SYSTEMS AND METHODS FOR IMPLEMENTING A MULTI-HOST RECORD LOCK MECHANISM

FIELD OF THE DISCLOSURE

The instant disclosure relates generally to database management. More specifically, this disclosure relates to embodiments of apparatuses, systems, and methods that manage data locks in a multi-host system.

BACKGROUND

Databases can be clustered to achieve greater capacity and higher efficiency, e.g., cloud storage, cloud computing, etc. When databases are clustered, a process or application may need two different objects located in two different databases to proceed. In such, a database management system need to lock the two desired objects for the process to proceed. If an object is requested by more than one processes at a same time, the database management system may need to unlock the object to free up the resource before the object can be locked for the requesting process. Embodiments of the disclosure and their equivalents disclosed herein provide locking and unlocking mechanisms of a database management system.

SUMMARY

The instant disclosure relates generally to database management. More specifically, this disclosure relates to embodiments of apparatuses, systems, and methods that manage data locks in a multi-host system. According to one embodiment, a method includes determining, by a processor, whether a program check condition exists. The method further includes determining, by the processor, whether a lock descriptor of a lock in a file lock table satisfies an unlocking condition. The method further includes determining, by the processor, whether a lock descriptor of a lock in a file lock table satisfies an unlocking condition. The method further includes releasing, by the processor, the lock by setting the lock descriptor's host identifier as zero. The method further includes determining, by the processor, whether any lock in the file lock table satisfies a lock conflict condition. The method further includes determining, by the processor, whether the file lock table includes any lock descriptor that satisfies a locking condition. The method further includes creating, by the processor, a new lock using the lock descriptor that satisfies the locking condition.

According to another embodiment, a computer program product includes a non-transitory computer-readable medium comprising instructions which, when executed by a processor of a computing system, cause the processor to perform the steps of: determining whether a program check condition exists; determining whether a lock descriptor of a lock in a file lock table satisfies an unlocking condition; releasing the lock by setting the lock descriptor's host identifier as zero; determining whether any lock in the file lock table satisfies a lock conflict condition; determining whether the file lock table includes any lock descriptor that satisfies a locking condition; and creating a new lock using the lock descriptor that satisfies the locking condition.

According to another embodiment, an apparatus includes a memory and a processor coupled to the memory. The processor is configured to perform the steps of: determining whether a program check condition exists; determining whether a lock descriptor of a lock in a file lock table satisfies an unlocking condition; releasing the lock by setting the lock descriptor's host identifier as zero; determining whether any lock in the file lock table satisfies a lock conflict condition; determining whether the file lock table includes any lock descriptor that satisfies a locking condition; and creating a new lock using the lock descriptor that satisfies the locking condition.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Database systems may be clustered to achieve greater performance and availability. A hardware device, e.g., a lock engine, may be used to coordinate the lock requested by a process executing on the database.

A clustered environment may allow each system to have its own local files, databases, and application groups along with shared files and one or more shared application groups. Local files and databases may only be accessed by a single system. Shared tiles and databases may be simultaneously accessible from all systems in the cluster.

A lock engine provides the actions of locking, establishing a communication path among the systems for coordinated actions. In one embodiment, extended processing complex-locking (XPC-L) may include a lock engine. Connection to the XPC-L is via a special input output processor that operates with low latencies.

Steps of methods, e.g., method 300, may be implemented as processor-executable instructions, for example, instructions written as programming codes. An instruction may be executed by any suitable processor, for example, x86 processors. An instruction may be programmed in any suitable computer language, for example, machine codes, assembly language codes, C language codes, C++ language codes, Fortran codes, Java codes, Matlab codes, or the like. The sequences of the steps of the method 300 may be changed without departing the scope of the disclosure.

Figure 1:
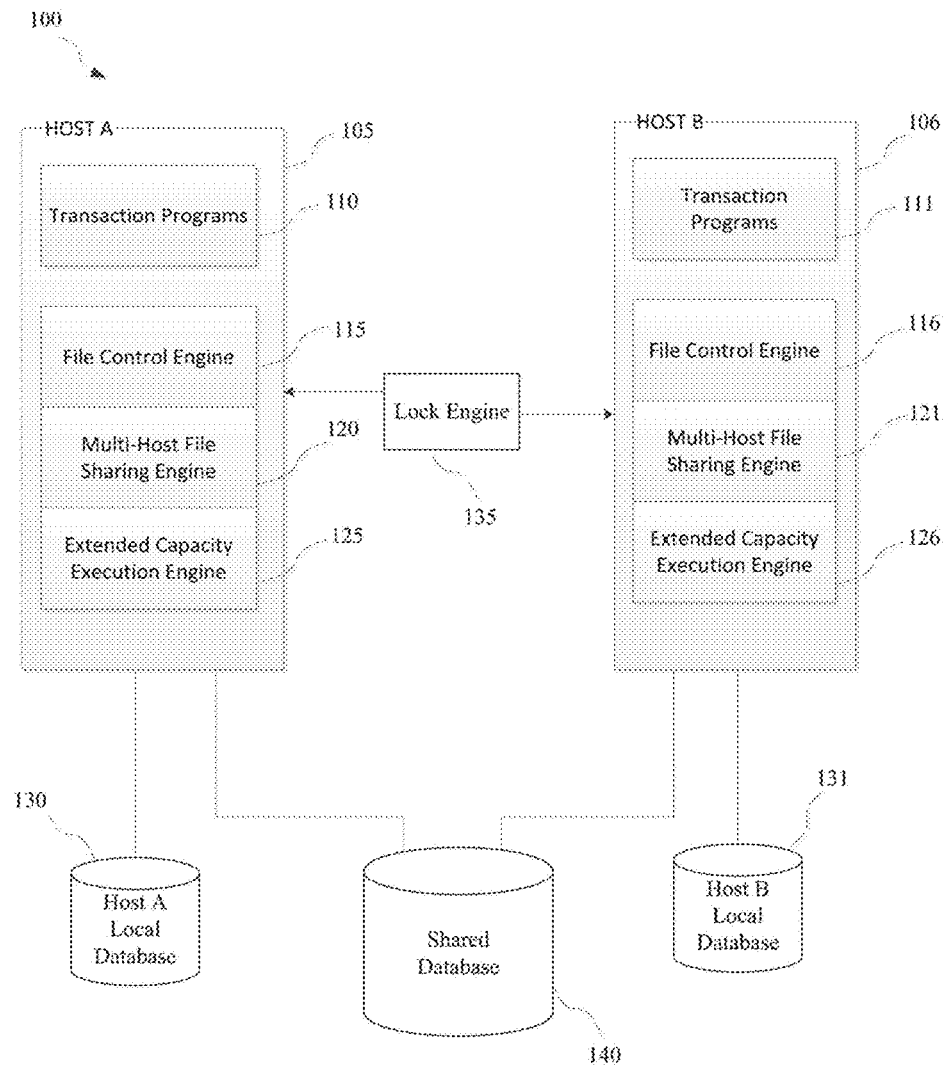
FIG. 1 is a schematic diagram of a clustered database with two host systems according to one embodiment of the disclosure.

FIG. 1 is a schematic diagram of a clustered database 100 with two host systems according to one embodiment of the disclosure. FIG. 1 is an example of a clustered database including Host A 105 and Host B 106. Host A 105 and Host B 106 may each serve as a traditional one-host transaction system.

Transactions programs 110 and 111 may be the programs, processes, and/or applications executed on Host A 105 and Host B 106, respectively.

As shown in FIG. 1, Host A 105 has a local database 130. Host B 106 has a local database 131. Host A 105 and Host B 106 both have access to a shared database 140. However, Host A 105 does not have access to the local database 131 of Host B 106. Similarly, Host B 106 does not have access to the local database 130 of Host A 105.

In one embodiment, local databases 130, 131 may only contain data that pertains only to a local host and local applications. Local database 130, 131 may not contain any recoverable data for capacity that requires sharing resources from both Host A 105 and Host B 106, e.g., extended transaction capacity (XTC).

As shown in FIG. 1, Host A 105 and Host B 106 each includes a multi-host File sharing engine 120, 121. In one embodiment, the multi-host file sharing engine 120, 121 may be a piece of software or a hardware. The multi-host file sharing engine 120, 121 may provide input/output data access from each host 105, 106 to the shared database 140.

As shown in FIG. 1, Host A 105 and Host B 106 each includes an extended capacity execution engine 125, 126. In one embodiment, the extended capacity execution engine 125, 126 may allow transaction programs 110, 111 to have concurrent access from multiple hosts 105, 106 to a common database, e.g., shared database 140, locked by the lock engine 135. The concurrent access provided by the extended capacity execution engine 125, 126 may increase the efficiency and throughput of the clustered database 100. In another embodiment, the extended capacity execution engine 125, 126 may enable the file control engine 115, 116 to work with the lock engine 135 to control database access and handle the host-to-host communications necessary for file sharing and for transaction scheduling across hosts. In one embodiment, the extended execution engine 125, 126 may be a piece of software or hardware.

As shown in FIG. 1, the clustered database 100 includes a lock engine 135. In one embodiment, the lock engine 135 may be a hardware device connected to all hosts 105, 106 in a clustered database 100. In one embodiment, the lock engine 135 may provide hardware locking. In another embodiment, the lock engine 135 may provide supporting software outside the hosts 105, 106 to allow access to shared database 140. In one embodiment, by controlling access, the lock engine 135 may include features of credential checking and authentication verification process in increasing the security, maintaining the integrity of the shared database 140. In another embodiment, the extended capacity execution engines 125, 126 may support the functionality of the lock engine 135.

Various methods of locking and/or unlocking, e.g., method 300, can be implemented on the lock engine 135. In other embodiments, various methods of locking and/or unlocking, e.g., method 300 can be implemented on the system of the shared database 140. In other embodiments, various methods of locking and/or unlocking, e.g., method 300, can be implemented on the various components of the hosts 105, 106, e.g., file control engines 115, 116, multi-host file sharing engines 120, 121, and extended capacity execution engine 125, 126.

Figure 2:
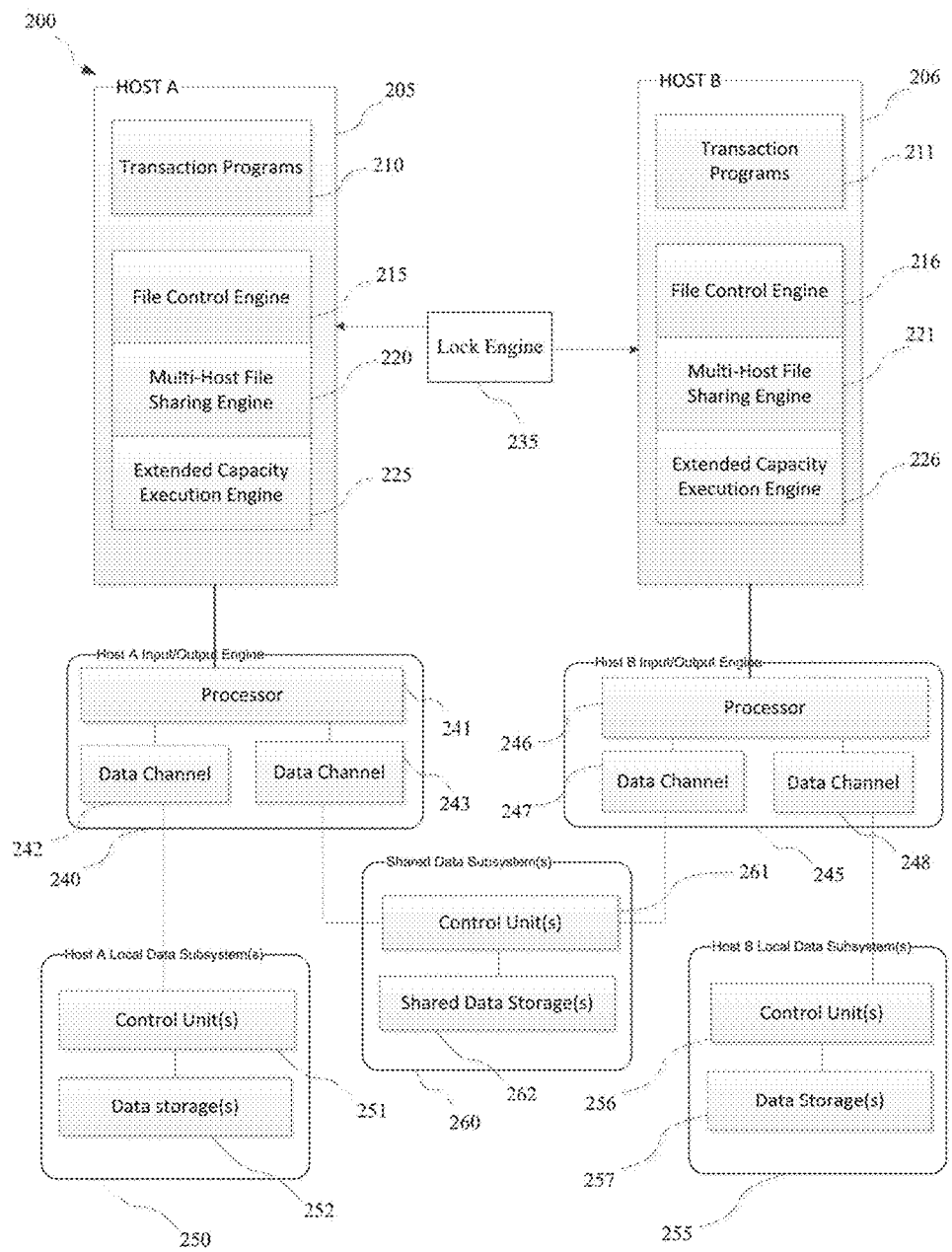
FIG. 2 is a schematic diagram of a clustered database with two host systems according to one embodiment of the disclosure.

FIG. 2 is a schematic diagram of a clustered database 200 with two host systems according to one embodiment of the disclosure. In one embodiment, the clustered database 200 may be an alternative embodiment of the clustered database 100.

FIG. 2 is an example of a clustered database including Host A 205 and Host B 206. Host A 205 and Host B 206 may each serve as a traditional one-host transaction system.

As shown in FIG. 2, the Host A local data subsystem 250 includes a control unit 251 and data storages 252. The control unit 251 may be a communication interface between the data storages 252 and the Host A input/output engine 240.

As shown in FIG. 2, the Host B local data subsystem 255 includes a control unit 256 and data storages 257. The control unit 256 may be a communication interface between the data storages 257 and the Host B input/output engine 245.

In one embodiment, local data subsystems 250, 255 may only contain data that pertains only to a local host and local applications. Local data storages 252, 257 may not contain any recoverable data for the capacity that requires sharing resources from both Host A 205 and Host B 206, e.g., extended transaction capacity (XTC).

As shown in FIG. 2, Host A 205 and Host B 206 each includes a multi-host file sharing engine 220, 221. In one embodiment, the multi-host file sharing engine 220, 221 may be a piece of software or a hardware. The multi-host file sharing engine 220, 221 may provide input/output data access from each host 205, 206 to the shared database 240.

As shown in FIG. 2, Host A 205 and Host B 206 each includes an extended capacity execution engine 225, 226. In one embodiment, the extended capacity execution engine 225, 226 may allow transaction programs 210, 211 to have concurrent access from multiple hosts 205, 206 to a common database, e.g., share data subsystems 260, locked by the lock engine 235. The concurrent access provided by the extended capacity execution engine 225, 226 may increase the efficiency and throughput of the clustered database 200. In another embodiment, the extended capacity execution engine 225, 226 may enable the file control engine 215, 216 to work with the lock engine 235 to control database access and handle the host-to-host communications necessary for file sharing and for transaction scheduling across hosts. In one embodiment, the extended execution engine 225, 226 may be a piece of software or hardware.

As shown in FIG. 2, the clustered database 200 includes a lock engine 235. In one embodiment, the lock engine 235 may be a hardware device connected to all hosts 205, 206 in a clustered database 200. In one embodiment, the lock engine 235 may provide hardware locking. In another embodiment, the lock engine 235 may provide supporting software outside the hosts 205, 206 to allow access to shared data subsystem 260. In one embodiment, by controlling access, the lock engine 235 may include features of credential checking and authentication verification process in increasing the security, maintaining the integrity of the shared data subsystem 260. In another embodiment, the extended capacity execution engines 225, 226 may support the functionality of the lock engine 235.

The clustered database 200 includes a Host A input/output engine 240. The input/output engine 240 may be the interface of the data communication for Host A 205. The engine 240 may include its own processor 241 dedicated to Host A 205. In one embodiment, the dedicated processor 241 may processes the data exchange in an efficient manner, increasing the overall efficiency of the clustered database 200. Further, as shown in FIG. 2, the input/output engine 240 includes data channels 242 dedicated to Host A local data subsystems 250. The input/output engine 240 further includes data channels 243 dedicated to shared data subsystems 260.

The clustered database 200 includes a Host B input/output engine 245. The input/output engine 245 may be the interface of the data communication for Host B 206. The engine 245 may include its own processor 246 dedicated to Host B 206. In one embodiment, the dedicated processor 246 may processes the data exchange in an efficient manner, increasing the overall efficiency of the clustered database 200. Further, as shown in FIG. 2, the input/output engine 245 includes data channels 248 dedicated to Host B local data subsystems 255. The input/output engine 245 further includes data channels 247 dedicated to shared data subsystems 260.

As shown in FIG. 2, the clustered database 200 includes a shared data subsystems 260. The shared data subsystem further includes shared data storage 262 and control unit 261. The control unit 261 may coordinate the requests for storing and/or retrieving data. The control unit 261 is in data communication with the data channels 243 and 247 of the host specific input/output engine 240 and 245, respectively.

Various methods of locking and/or unlocking, e.g., method 300, can be implemented on the lock engine 235. In other embodiments, various methods of locking and/or unlocking, e.g., method 300 can be implemented on the system of the shared data subsystem 260. In other embodiments, various methods of locking and/or unlocking, method 300 can be implemented on the various components of the hosts 205, 206, e.g., file control engines 215, 216, multi-host file sharing engines 220, 221, and extended capacity execution engine 225, 226. In yet other embodiments, various methods of locking and/or unlocking, e.g., method 300 can be implemented on local input/output engines, e.g., Host A input/output engine 240 and Host B input/output engine 245. In yet other embodiments, various methods of locking and/or unlocking, e.g., method 300 can be implemented on the shared data systems, e.g. the control units 261 of the shared data subsystems 260.

Figure 3:
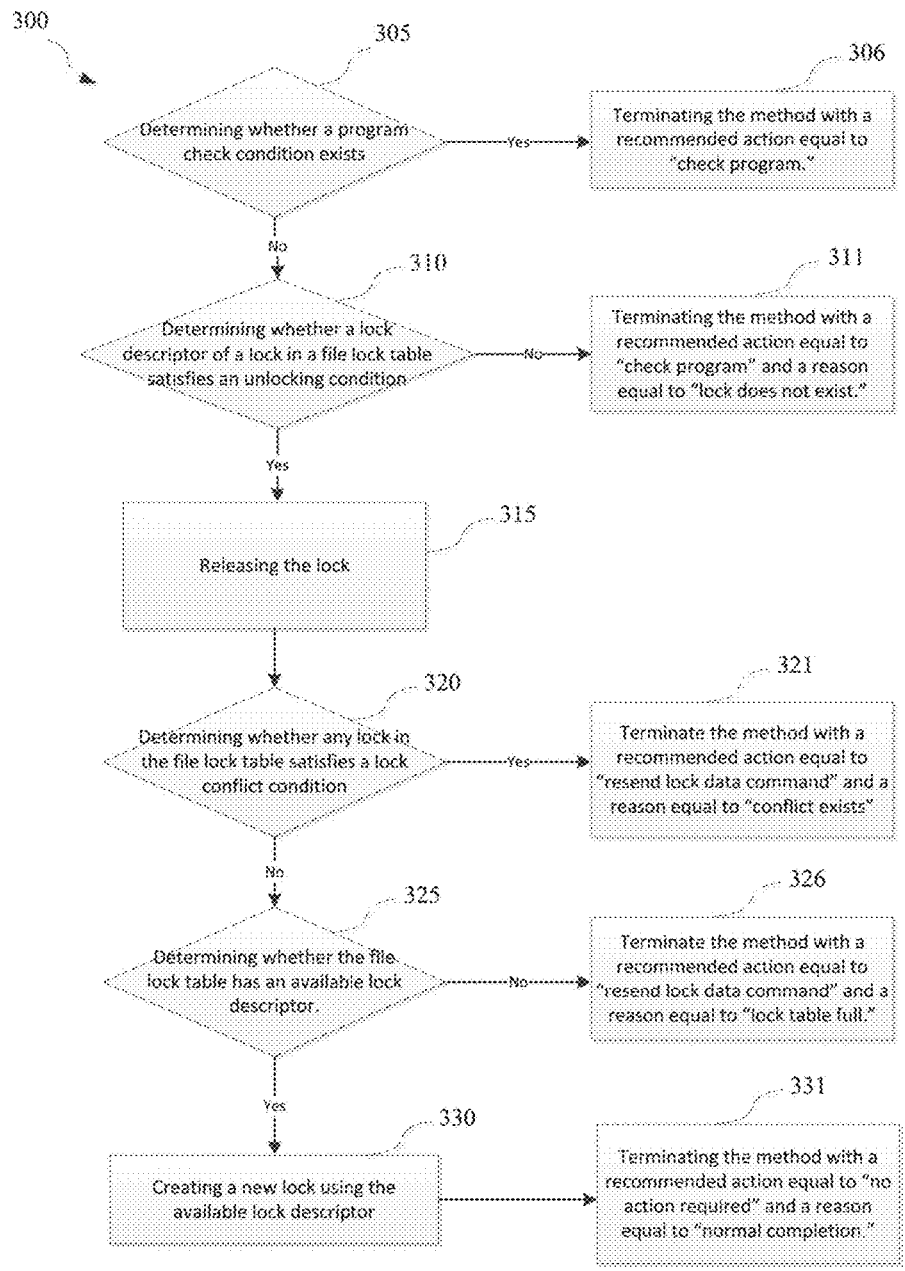
FIG. 3 is a method for lock-unlock data according to one embodiment of the disclosure.

FIG. 3 is a method 300 for lock-unlock data according to one embodiment of the disclosure. The method 300 may be implemented in the clustered database 100 in FIG. 1. The method 300 may be implemented in the clustered database 200 in FIG. 2, The method 300 may include the lock-unlock data command 400 in FIG. 4. The method 300 may include the lock-unlock data report 500 in FIG. 5. The method 300 may be used in combination with the lock data command 600 in FIG. 6. The method 300 may be used in combination with the lock data report 700 in FIG. 7. The method 300 may be implemented in the computer network 800 in FIG. 8. The method 300 may be implemented in the computer system 900 in FIG. 9. The method 300 may be implemented in the servers 1000 and 1050 in FIGS. 10A and 10B, respectively.

As shown in FIG. 3, the method 300 starts at block 305, which includes determining whether a program check condition exists. If the program check condition exist, the method proceed to block 306, which includes terminating the method with a recommended action equal to "check program." If none of the program check condition exists, the method proceeds to block 310.

At block 305, the program check condition may include checking whether LOCK/UNLOCK_FILE_IDENTIFIER equals zero. If this program check condition exists, the method 300 may report back to the requesting host with the corresponding reason: file identifier equals zero.

At block 305, the program check condition may include checking whether LOCK/UNLOCK$_{13}$ FILE_RELATIVE_SEGMENT_OFFSET is not less than or equal to LOCK/UNLOCK_LAST_FILE_RELATIVE_SEGMENT_OFFSET. If this condition exists, the method 300 may report back to the requesting host with the corresponding reason: file relative segment offset is not less than or equal to last file relative segment offset.

At block 306, the method 300 is terminated with a recommended action equal to "check program."

Block 310 includes determining whether a lock descriptor of a lock in a file lock table satisfies an unlocking condition. If the determination at 310 is "yes," the method 300 proceeds to block 315. If the determination at 310 is "no," the method 300 proceeds to block 311.

In one embodiment, at block 310, an unlocking condition may include one or more conditions. In one embodiment, an unlocking condition may include the lock descriptor's file identifier equals UNLOCK_FILE_IDENTIFIER. The unlocking condition may also include the file relative segment offset equals UNLOCK_FILE_RELATIVE_SEGMENT_OFFSET. The unlocking condition may include the last file relative segment offset equals UNLOCK_LAST_FILE_RELATIVE_SEGMENT_OFFSET. The unlocking condition may also include the host identifier equals the host identifier passed by an input/output processing (e.g., XIOP) interface.

At block 315, the method 300 releases the lock. In another embodiment, at block 315, the lock is released by updating the lock descriptor's host identifier to zero.

In one embodiment, there can only be one lock in the file lock table that satisfies the unlocking condition in 310. More than one locks in the file lock table satisfying the unlocking condition may create a "conflict." Such conflict may be caught in block 320, and further reported as "conflict exists" in block 321.

At block 320, the method determines whether any lock remains in the file lock table satisfies a lock conflict condition. If the determination at 320 is "yes," the method 300 proceeds to block 321 which includes terminating the method with a recommended action equal to "resend lock data command" and a reason equal to "conflict exists." If the determination at 320 is "no," the method proceeds to block 325.

At block 320, a lock conflict condition can include a lock descriptor's host identifier does not equal zero. In another embodiment, at block 320, a lock conflict condition can include a lock descriptor's file identifier equals LOCK_FILE_IDENTIFIER. In one embodiment, the lock conflict condition may include: more than one locks satisfy the unlocking condition at 310.

Figure 4:
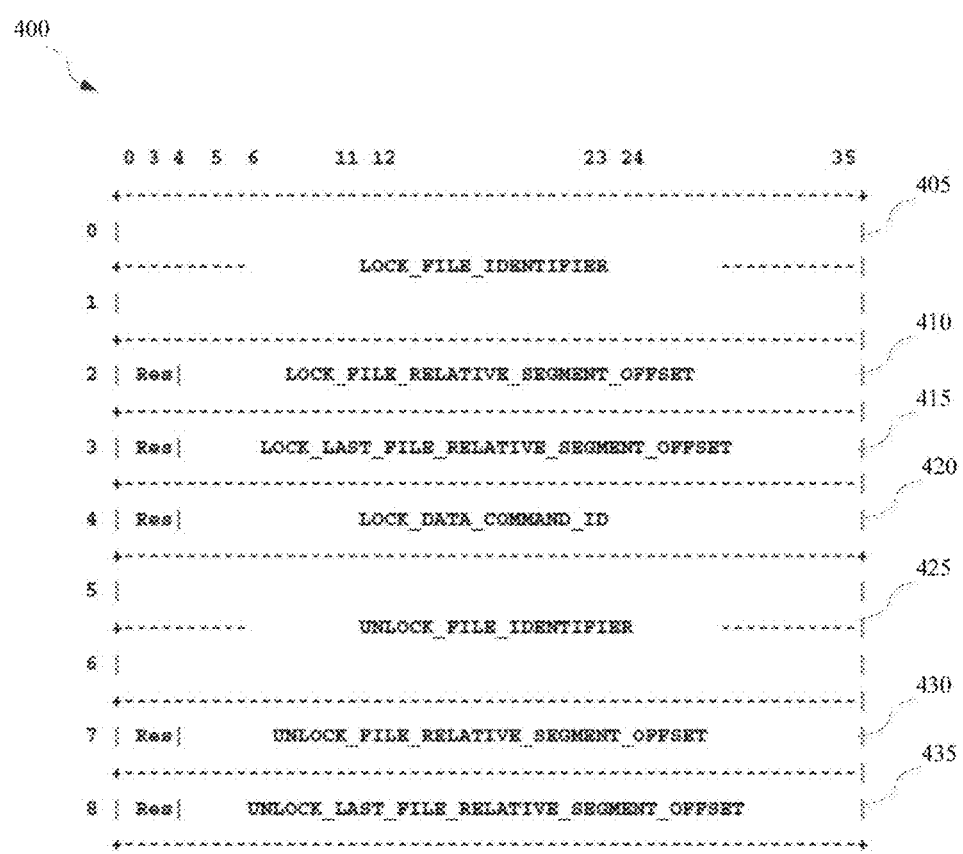
FIG. 4 is an exemplary lock-unlock data command according to one embodiment of the disclosure.

In another embodiment, at block 320, a lock conflict condition can include the lock descriptor's file relative segment offset and last file relative segment offset to overlap with one or more segments addressed by the command, e.g., the command 400 in FIG. 4.

At block 325, the method determines whether the file lock table has an available lock descriptor. If the determination at 325 is "no," the method proceeds to block 326. If the determination at 325 is "yes," the method 300 proceeds to 330.

In one embodiment, at block 325, an available lock descriptor may include the following condition: the lock descriptor's host identifier equals zero.

At block 326, the method 300 terminates with a recommended action equal to "resent lock data command" and a reason equal to "lock table full."

At block 330, the method 300 creates a new lock using the available lock descriptor.

At 330, the method 300 may create a new lock by setting the available lock descriptor's file identifier to equal LOCK_FILE_IDENTIFIER. At 330, the method 300 may create a new lock by setting the available lock descriptor's file relative segment offset to equal LOCK_FILE_RELATIVE_SEGMENT_OFFSET. At 330, the method 300 may create a new lock by setting the available lock descriptor's last file relative segment offset to equal LOCK_LAST_FILE_RELATIVE_SEGMENT_OFFSET. At 330, the method 300 may create a new lock by setting the available lock descriptor's host identifier to equal the host identifier passed by the input output processing interface XIOP). At 330, the method 300 may create a new lock by setting the available lock descriptor's lock data command ID to equal LOCK_DATA_COMMAND_ID.

At block 331, the method 300 terminates with a recommended action equal to "no action required" and a reason equal to "normal completion."

FIG. 4 is an exemplary lock-unlock data command 400 according to one embodiment of the disclosure. The command 400 may be implemented in the clustered database 100 in FIG. 1. The command 400 may be implemented in the clustered database 200 in FIG. 2. The information specified in the sections of the command 400 may be used in the method 300 in FIG. 3. The command 400 may be used in combination with the lock-unlock data report 500 in FIG. 5. The command 400 may be used in combination with the lock data command 600 in FIG. 6. The command 400 may be used in combination with the lock data report 700 in FIG. 7. The command 400 may be implemented in the computer network 800 in FIG. 8. The command 400 may be implemented in the computer system 900 in FIG. 9. The command 400 may be implemented in the servers 1000 and 1050 in FIGS. 10A and 10B, respectively. The term "RES" shown in FIG. 4 indicates reserved section.

As shown in FIG. 4, the section 405 includes LOCK_FILE_IDENTIFIER. A LOCK_FILE_IDENTIFIER may be a lock file identifier. The LOCK_FILE_IDENTIFIER in section 405 may be used in blocks 320 and 330.

As shown in FIG. 4, the section 410 includes LOCK_FILE_RELATIVE_SEGMENT_OFFSET. LOCK_FILE_RELATIVE_SEGMENT_OFFSET refers to a range of memory segments of the file to be locked. LOCK_FILE_RELATIVE_SEGMENT_OFFSET may be use docks 305 and 330.

As shown in FIG. 4, the section 415 includes LOCK_LAST_FILE_RELATIVE_SEGMENT_OFFSET. LOCK_LAST_FILE_RELATIVE_SEGMENT_OFFSET refers to a last memory segment of the filed to be locked, LOCK_LAST_FILE_RELATIVE_SEGMENT_OFFSET may be used in blocks 305 and 330.

As shown in FIG. 4, the section 420 includes LOCK_DATA_COMMAND_ID. LOCK_DATA_COMMAND_ID refers to an identification for the command to lock data. LOCK_DATA_COMMAND_ID may be used in block 330.

As shown in FIG. 4, the section 425 includes UNLOCK_FILE_IDENTIFIER. UNLOCK_FILE_IDENTIFIER refers to an identification of the file to be unlocked. UNLOCK_FILE_IDENTIFIER may be used in blocks 305 and 310.

As shown in FIG. 4, the section 430 includes UNLOCK_FILE_RELATIVE_SEGMENT_OFFSET. UNLOCK_FILE_RELATIVE_SEGMENT_OFFSET refers to memory sections of the tiled to be unlocked. UNLOCK_FILE_RELATIVE_SEGMENT_OFFSET may be used in blocks 305 and 310.

As shown in FIG. 4, the section 435 includes UNLOCK_LAST_FILE_RELATIVE_SEGMENT_OFFSET. UNLOCK_LAST_FILE_RELATIVE_SEGMENT_OFFSET refers to a last memory segment of the file to be unlocked. UNLOCK_LAST_FILE_RELATIVE_SEGMENT_OFFSET may be used in blocks 305 and 310.

Figure 5:
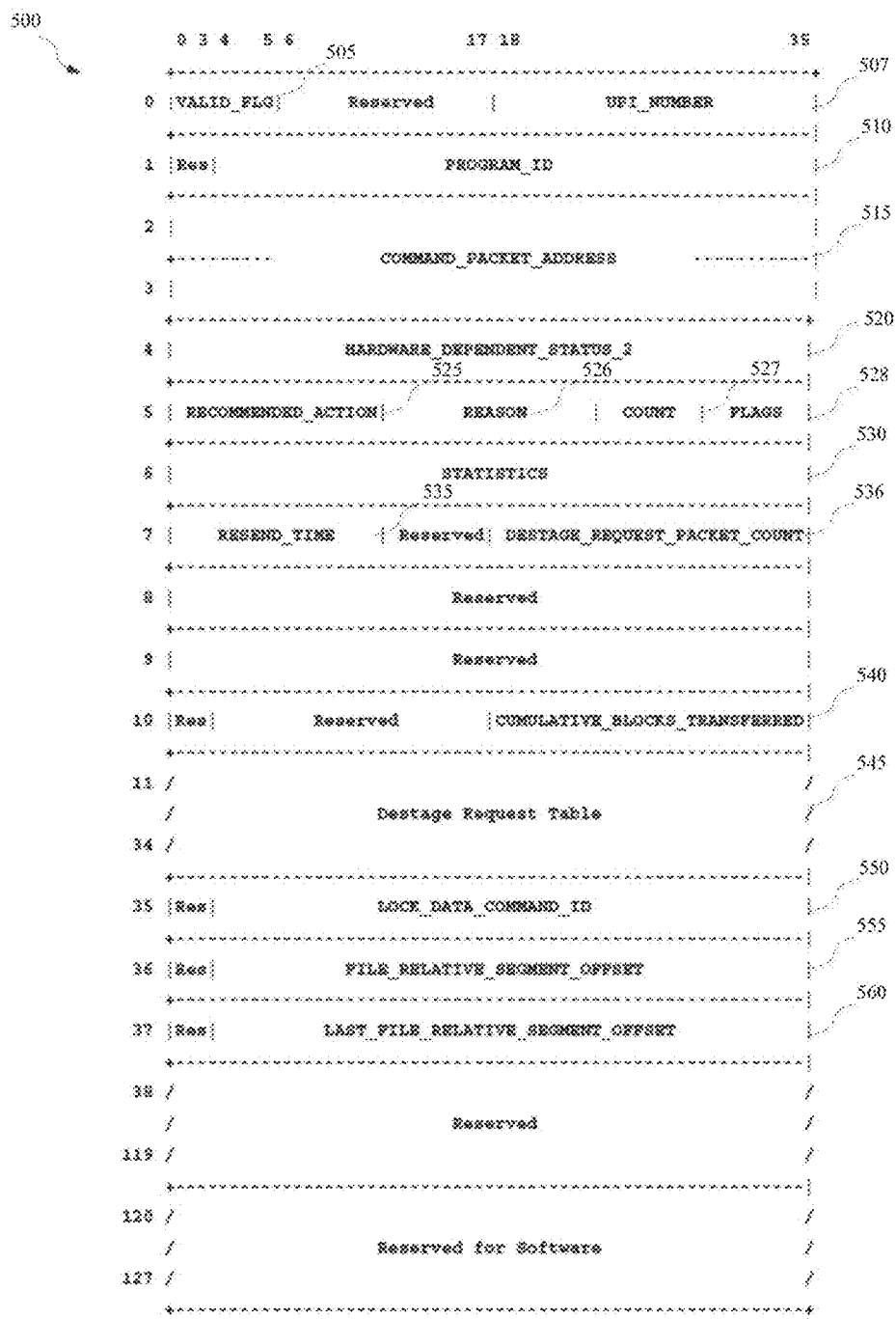
FIG. 5 is an exemplary lock-unlock data report according to one embodiment of the disclosure.

FIG. 5 is an exemplary lock-unlock data report 500 according to one embodiment of the disclosure. The report 500 may be implemented in the clustered database 100 in FIG. 1. The report 500 may be implemented in the clustered database 200 in FIG. 2. The report 500 may be generated during execution of the method 300 in FIG. 3. The report 500 may be used in combination with the lock-unlock data command 400 in FIG. 4. The report 500 may be used in combination with the lock data command 600 in FIG. 6. The report 500 may be used in combination with the lock data report 700 in FIG. 7. The report 500 may be implemented in the computer network 800 in FIG. 8, The report 500 may be implemented in the computer system 900 in FIG. 9. The report 500 may be implemented in the servers 1000 and 1050 in FIGS. 10A and 10B, respectively.

Section 505 includes VALID_FLAG. Section 507 includes UPI_NUMBER. Section 510 includes PROGRAM_ID. Section 515 includes COMMAND_PACKET_ADDRESS. Section 520 includes HARDWARE_DEPENDENT_STATUS_2. Section 527 includes COUNT. Section 528 includes FLAGS.

Section 525 includes RECOMMENDED_ACTION. RECOMMENDED_ACTION at section 525 may be used in blocks 306, 311, 321, 326, and 331.

Section 526 includes REASON. REASON at section 526 may be used in blocks 306, 311, 321, 326, and 331.

Section 530 includes STATISTICS. Section 535 includes RESEND_TIME. Section 536 includes DESTAGE_REQUEST_PACKET_COUNT. Section 540 includes CUMULATIVE_BLOCKS_TRANSFERRED. Section 545 includes DESTAGE_REQUEST_TABLE. Section 550 includes LOCK_DATA_COMMAND_ID. Section 555 includes FILE_RELATIVE_SEGMENT_OFFSET. Section 560 includes LAST_FILE_RELATIVE_SEGMENT_OFFSET.

Figure 6:
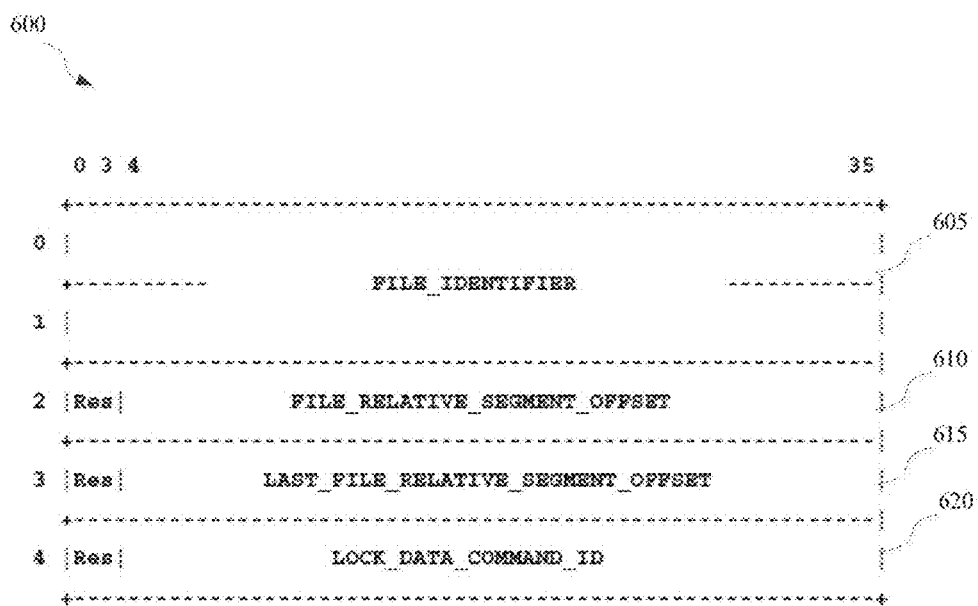
FIG. 6 is an exemplary lock data command according to one embodiment of the disclosure.

FIG. 6 is an exemplary lock data command according to one embodiment of the disclosure. The command 600 may be implemented in the clustered database 100 in FIG. 1. The command 600 may be implemented in the clustered database 200 in FIG. 2. The command 600 may be used in combination with the method 300 in FIG. 3. The command 600 may be used in combination with the command 400 in FIG. 4. The command 600 may be used in combination with the lock-unlock data report 500 in FIG. 5. The command 600 may be used in combination with the lock data report 700 in FIG. 7. The command 600 may be implemented in the computer network 800 in FIG. 8. The command 600 may be implemented in the computer system 900 in FIG. 9. The command 600 may be implemented in the servers 1000 and 1050 in FIGS. 10A and 10B, respectively.

The command 600 includes FILE_IDENTIFIER at section 605, The FILE_IDENTIFIER at section 605 may be used in method 300.

The command 600 includes FILE_RELATIVE_SEGMENT_OFFSET at section 610. The FILE_RELATIVE_SEGMENT_OFFSET at section 605 may be used in method 300.

The command 600 includes LAST_FILE_RELATIVE_SEGMENT_OFFSET at section 615. The LAST_FILE_RELATIVE_SEGMENT_OFFSET at section 615 may be used in method 300.

The command 600 includes LOCK_DATA_COMMAND_ID at section 620. The LOCK_DATA_COMMAND_ID at section 620 may be used in method 300.

Figure 7:
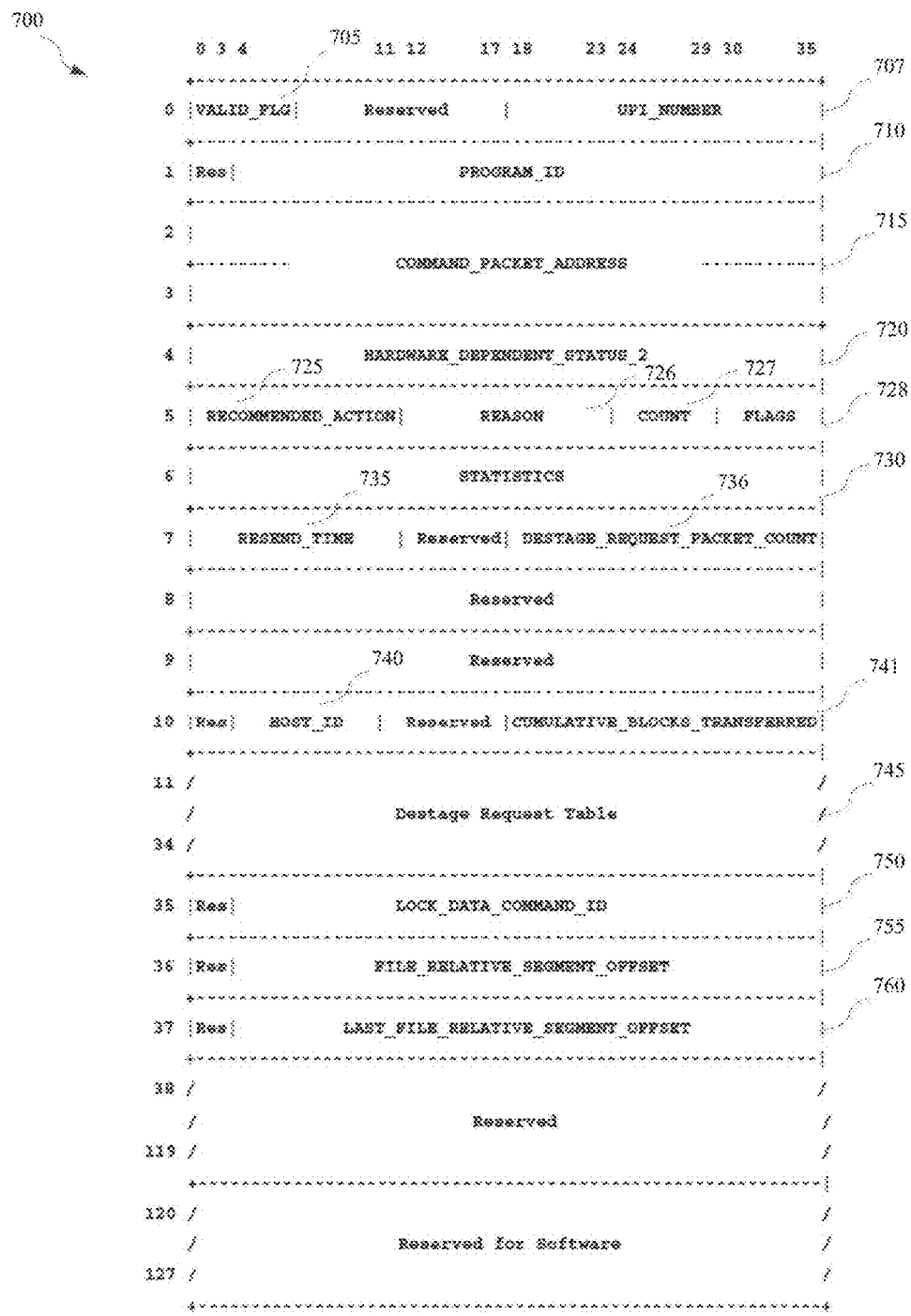
FIG. 7 is an exemplary lock data report according to one embodiment of the disclosure.

FIG. 7 is an exemplary lock data report 700 according to one embodiment of the disclosure. The report 700 may be implemented in the clustered database 100 in FIG. 1. The report 700 may be implemented in the clustered database 200 in FIG. 2. The report 500 may be included the method 700 in FIG. 3. The report 700 may be used in combination with the lock-unlock data command 400 in FIG. 4. The report 700 may be used in combination with the lock-unlock data report 500 in FIG. 5. The report 700 may be used in combination with the lock data command 600 in FIG. 6. The report 700 may be implemented in the computer network 800 in FIG. 8. The report 700 may be implemented in the computer system 900 in FIG. 9. The report 700 may be implemented in the servers 1000 and 1050 in FIGS. 10A and 10B, respectively.

Section 705 includes VALID_FLG. Section 707 includes UPI_NUMBER. Section 710 includes PROGRAM_ID. Section 715 includes COMMAND_PACKET_ADDRESS. Section 720 includes HARDWARE_DEPENDENT_STATUS_2. Section 727 includes COUNT. Section 728 includes FLAGS.

Section 725 includes RECOMMENDED_ACTION. RECOMMENDED_ACTION at section 725 may be used in method 300.

Section 726 includes REASON. REASON at section 726 may be used in method 300.

Section 730 includes STATISTICS. Section 735 includes RESEND_TIME. Section 736 includes DESTAGE_REQUEST_PACKET_COUNT. Section 740 includes HOST_ID. Section 741 includes CUMULATIVE_BLOCKS_TRANSFERRED. Section 745 includes DESTAGE_REQUEST_TABLE. TABLE Section 750 includes LOCK_DATA_COMMAND_ID. Section 755 includes FILE_RELATIVE_SEGMENT_OFFSET. Section 760 includes LAST_FILE_RELATIVE_SEGMENT_OFFSET.

Figure 8:
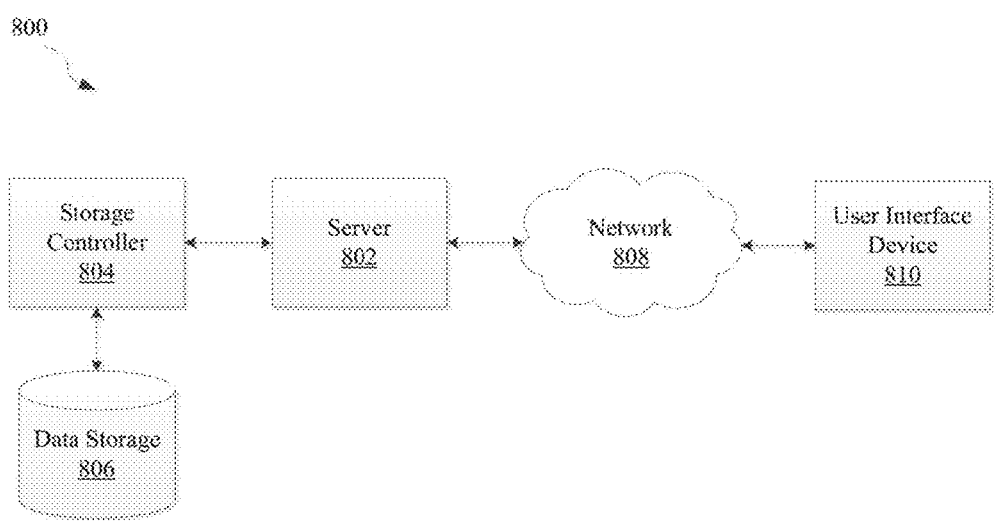
FIG. 8 is an exemplary block diagram illustrating a computer network according to one embodiment of the disclosure.

FIG. 8 illustrates a computer network 800 for obtaining access to database files in a computing system according to one embodiment of the disclosure. The computer network 800 may include a server 802, a data storage device 806, a network 808, and a user interface device 810. The server 802 may also be a hypervisor-based system executing one or more guest partitions hosting operating systems with modules having server configuration information. In a further embodiment, the computer network 800 may include a storage controller 804, or a storage server configured to manage data communications between the data storage device 806 and the server 802 or other components in communication with the network 808. In an alternative embodiment, the storage controller 804 may be coupled to the network 808.

In one embodiment, the user interface device 810 is referred to broadly and is intended to encompass a suitable processor-based device such as a desktop computer, a laptop computer, a personal digital assistant (PDA) or tablet computer, a smartphone or other mobile communication device having access to the network 808. In a further embodiment, the user interface device 810 may access the Internet or other wide area or local area network to access a web application or web service hosted by server 802 and may provide a user interface for enabling a user to enter or receive information.

The network 808 may facilitate communications of data between the server 802 and the user interface device 810. The network 808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 810 accesses the server 802 through an intermediate sever (not shown). For example, in a cloud application the user interface device 810 may access an application server. The application server fulfills requests from the user interface device 810 by accessing a database management system (DBMS). In this embodiment, the user interface device 810 may be a computer or phone executing a Java application making requests to a JBOSS server executing on a Linux server, which fulfills the requests by accessing a relational database management system (RDMS) on a mainframe server.

Figure 9:
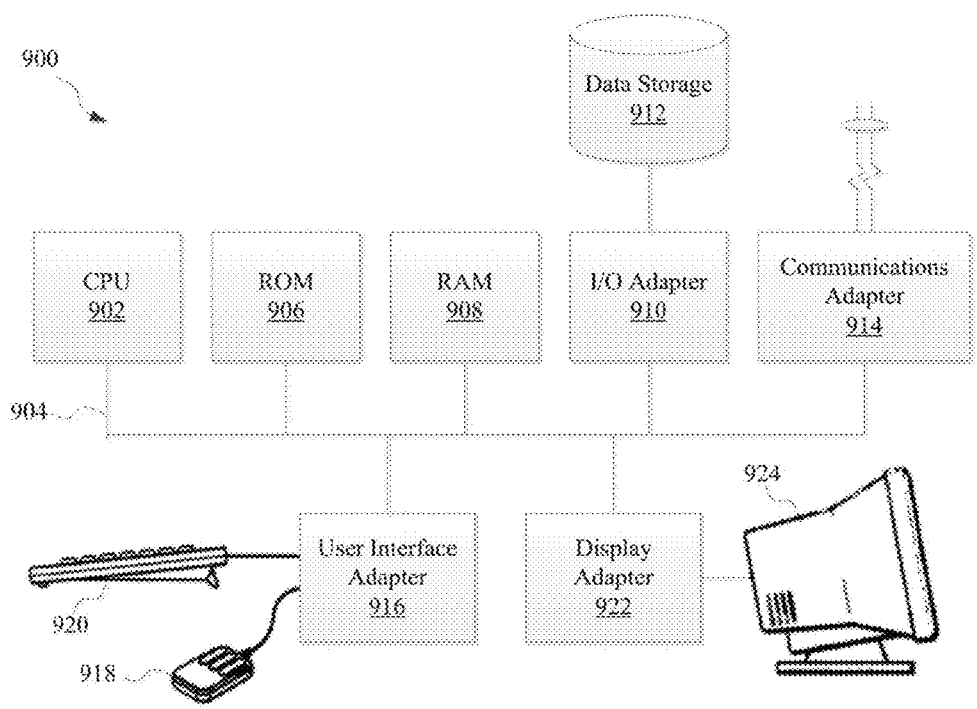
FIG. 9 is a block diagram illustrating a computer system according to one embodiment of the disclosure.

FIG. 9 illustrates a computer system 900 adapted according to certain embodiments of the server 802 and/or the user interface device 810. The central processing unit ("CPU") 902 is coupled to the system bus 904. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 may also include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROM) 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an I/O adapter 910, a communications adapter 914, a user interface adapter 916, and a display adapter 922. The I/O adapter 910 and/or the user interface adapter 916 may, in certain embodiments, enable a user to interact with the computer system 900. In a further embodiment, the display adapter 922 may display a graphical user interface (GUI) associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 900 through a network connection to the I/O adapter 910. The communications adapter 914 may be adapted to couple the computer system 900 to the network 808, which may be one or more of a LAN, WAN, and/or the Internet. The user interface adapter 916 couples user input devices, such as a keyboard 920, a pointing device 918, and/or a touch screen (not shown) to the computer system 900. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of the server 802 and/or the user interface device 910. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 900 may be virtualized for access by multiple users and/or applications.

Figure 10A:
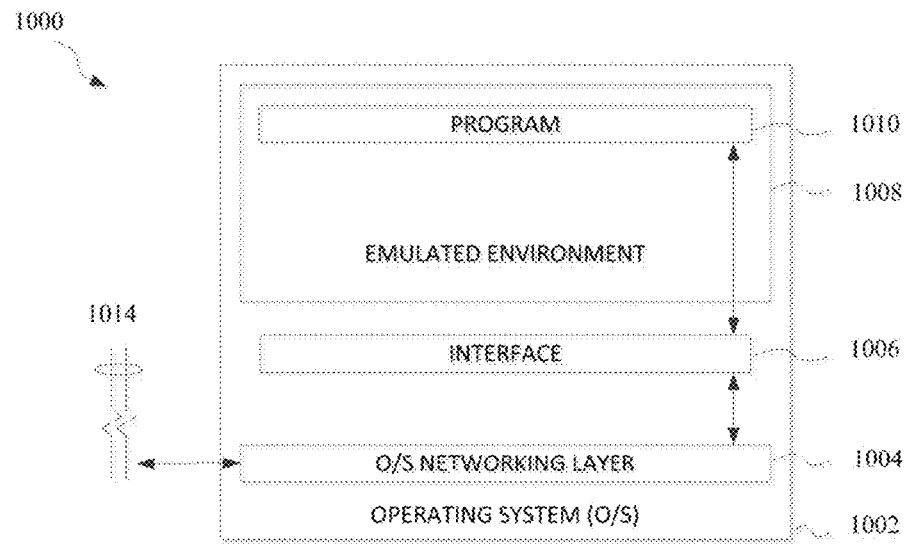
FIG. 10A is a block diagram illustrating a server hosting an emulated software environment for virtualization according to one embodiment of the disclosure.

FIG. 10A is a block diagram illustrating a server 1000 hosting an emulated software environment for virtualization according to one embodiment of the disclosure. An operating system 1002 executing on a server 1000 includes drivers for accessing hardware components, such as a networking layer 1004 for accessing the communications adapter 1014. The operating system 1002 may be, for example, Linux or Windows. An emulated environment 1008 in the operating system 1002 executes a program 1010, such as Communications Platform (CPComm) or Communications Platform for Open Systems (CPCommOS). The program 1010 accesses the networking layer 1004 of the operating system 1002 through a non-emulated interface 1006, such as extended network input output processor (XNIOP). The non-emulated interface 1006 translates requests from the program 1010 executing in the emulated environment 1008 for the networking layer 1004 of the operating system 1002.

Figure 10B:
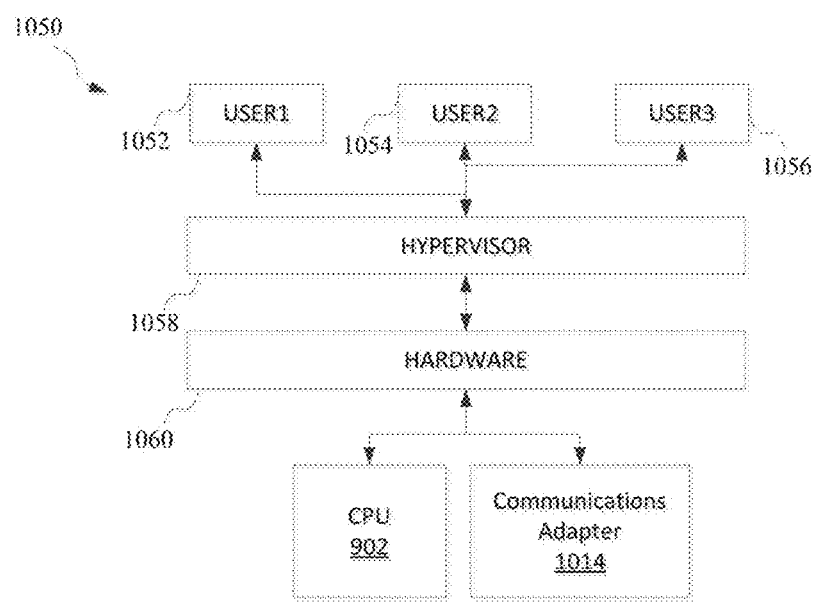
FIG. 10B is a block diagram illustrating a server hosing an emulated hardware environment according to one embodiment of the disclosure.

In another example, hardware in a computer system may be virtualized through a hypervisor. FIG. 10B is a block diagram illustrating a server 1050 hosting an emulated hardware environment according to one embodiment of the disclosure. Users 1052, 1054, 1056 may access the hardware 1060 through a hypervisor 1058. The hypervisor 1058 may be integrated with the hardware 1058 to provide virtualization of the hardware 1058 without an operating system, such as in the configuration illustrated in FIG. 10A. The hypervisor 1058 may provide access to the hardware 1058, including the CPU 902 and the communications adaptor 1014.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   determining, by a processor, whether a program check condition exists;
   determining, by the processor, whether a lock descriptor of a lock in a file lock table satisfies an unlocking condition;
   releasing, by the processor, the lock by setting the lock descriptor's host identifier as zero;
   determining, by the processor, whether any lock in the file lock table satisfies a lock conflict condition, wherein the lock conflict condition comprises one or more of a specific value for lock descriptor's host identifier, more than one locks satisfy the unlocking condition, and an overlap in addressed segments;

determining, by the processor, whether the file lock table has an available lock descriptor; and creating, by the processor, a new lock using the lock descriptor that satisfies the locking condition by:

setting, by the processor, the lock descriptor's last file relative segment as specified in a lock-unlock command;

setting, by the processor, the lock descriptor's host identifier as specified in the lock-unlock command; and setting, by the processor, the lock descriptor's lock data command identification as specified in the lock-unlock command.

2. The method according to claim 1 further including terminating, by the processor, the method with a recommended action equal to "check program," if the program check condition exists.

3. The method according to claim 1, further including terminating, by the processor, the method with a recommended action equal to "check program" and a reason equal to "lock does not exist," if no lock descriptor of a lock in the file lock table satisfies the unlocking condition.

4. The method according to claim 1, further comprising terminating, by the processor, the method with a recommended action equal to "resend lock data command" and a reason equal to "conflict exists," if the file lock table includes the lock that satisfies the lock conflict condition.

5. The method according to claim 1, further comprising terminating, by the processor, the method with a recommended action equal to "resend lock data command" and a reason equal to "lock table full," if the file lock table does not have any available lock descriptor.

6. The method according to claim 1, wherein the step of creating the new lock using the lock descriptor that satisfies the locking condition further includes, setting, by the processor, the lock descriptor's file identifier as specified in a lock-unlock command; and setting, by the processor, the lock descriptor's file relative segment offset as specified in the lock-unlock command.

7. A computer program product comprising:

a non-transitory computer-readable medium comprising instructions which, when executed by a processor of a computing system, cause the processor to perform the steps of:

determining whether a program check condition exists;

determining whether a lock descriptor of a lock in a file lock table satisfies an unlocking condition;

releasing the lock by setting the lock descriptor's host identifier as zero;

determining whether any lock in the file lock table satisfies a lock conflict condition, wherein the lock conflict condition comprises one or more of a specific value for lock descriptor's host identifier, more than one locks satisfy the unlocking condition, and an overlap in addressed segments;

determining whether the file lock table has an available lock descriptor; and creating a new lock using the lock descriptor that satisfies the locking condition by:

setting the lock descriptor's last file relative segment as specified in a lock-unlock command;

setting the lock descriptor's host identifier as specified in the lock-unlock command; and setting the lock descriptor's lock data command identification as specified in the lock-unlock command.

8. The computer program product of claim 7, wherein the steps further include terminating the method with a recommended action equal to "check program," if the program check condition exists;

(setting the lock descriptor's last file relative segment as specified in a lock-unlock command;

setting the lock descriptor's host identifier as specified in the lock-unlock command; and setting the lock descriptor's lock data command identification as specified in the lock-unlock command.

9. The computer program product of claim 7, wherein the steps further include terminating the method with a recommended action equal to "check program" and a reason equal to "lock does not exist," if no lock descriptor of a lock in the file lock table satisfies the unlocking condition.

10. The computer program product of claim 7, wherein the steps further include terminating the method with a recommended action equal to "resend lock data command" and a reason equal to "conflict exists," if the file lock table includes the lock that satisfies the lock conflict condition.

11. The computer program product of claim 7, wherein the steps further include terminating the method with a recommended action equal to "resend lock data command" and a reason equal to "lock table full," if the file lock table does not have any available lock descriptor.

12. The computer program product of claim 7, wherein the step of creating the new lock using the lock descriptor that satisfies the locking condition further includes setting the lock descriptor's file identifier as specified in a lock-unlock command; and setting the lock descriptor's file relative segment offset as specified in the lock-unlock command.

13. An apparatus, comprising:

a memory; and a processor coupled to the memory, the processor being configured to perform the steps of:

determining whether a program check condition exists;

determining whether a lock descriptor of a lock in a file lock table satisfies an unlocking condition;

releasing the lock by setting the lock descriptor's host identifier as zero;

determining whether any lock in the file lock table satisfies a lock conflict condition, wherein the lock conflict condition comprises one or more of a specific value for lock descriptor's host identifier, more than one locks satisfy the unlocking condition, and an overlap in addressed segments;

determining whether the file lock table has an available lock descriptor that satisfies a locking condition; and creating a new lock using the lock descriptor that satisfies the locking condition by:

setting the lock descriptor's last file relative segment as specified in a lock-unlock command;

setting the lock descriptor's host identifier as specified in the lock-unlock command; and setting the lock descriptor's lock data command identification as specified in the lock-unlock command.

14. The apparatus of claim 13, wherein the steps further include
- terminating the method with a recommended action equal to "check program," if the program check condition exists.

15. The apparatus of claim 13, wherein the steps further include
- terminating the method with a recommended action equal to "check program" and a reason equal to "lock does not exist," if no lock descriptor of a lock in the file lock table satisfies the unlocking condition.

16. The apparatus of claim 13, wherein the steps further include
- terminating the method with a recommended action equal to "resend lock data command" and a reason equal to "conflict exists," if the file lock table includes the lock that satisfies the lock conflict condition.

17. The apparatus of claim 13, wherein the step of creating the new lock using the lock descriptor that satisfies the locking condition further includes
- setting the lock descriptor's file identifier as specified in a lock-unlock command; and
- setting the lock descriptor's file relative segment offset as specified in the lock-unlock command.

\* \* \* \* \*